United States Patent [19]

Zitting

[11] 4,032,159

[45] June 28, 1977

[54] INTERFERENCE COMPRESSION SEAL
[75] Inventor: Gordon T. Zitting, Sandy, Utah
[73] Assignee: Poly Seal, Inc., Salt Lake City, Utah
[22] Filed: Oct. 28, 1975
[21] Appl. No.: 626,589
[52] U.S. Cl. .............................. 277/145; 277/165; 277/188 A; 277/190
[51] Int. Cl.² .......................................... F16J 9/06
[58] Field of Search .............. 277/188 A, 165, 190, 277/188 R, 144, 145, 143

[56] References Cited

UNITED STATES PATENTS

| | | | |
|---|---|---|---|
| 1,079,976 | 12/1913 | Cota | 277/190 |
| 1,175,383 | 3/1916 | Shephard | 277/190 |
| 1,481,160 | 1/1924 | Switzer | 277/188 A |
| 3,186,702 | 6/1965 | Taylor | 277/188 A |
| 3,663,076 | 5/1972 | Valente | 277/190 |

FOREIGN PATENTS OR APPLICATIONS 1,316,841    5/1973    United Kingdom .......... 277/188 A Primary Examiner—Richard E. Aegerter
Assistant Examiner—L. Footland
Attorney, Agent, or Firm—Lynn G. Foster

[57] ABSTRACT

An interference compression seal comprising a delta-shaped seal of relatively soft elastomeric material adapted to be placed in a groove between relatively moving machine parts with the apex of the delta directed radially outwardly creating a line seal and a pair of somewhat triangularly shaped anti-extrusion rings of rigid synthetic resinous material respectively engaging one of the sloped or bevelled surfaces (diagonal sides) of the delta-shaped seal.

2 Claims, 3 Drawing Figures

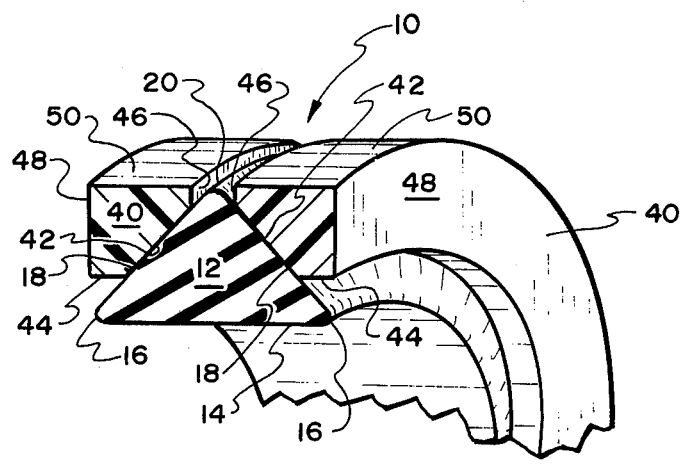
FIG. 1
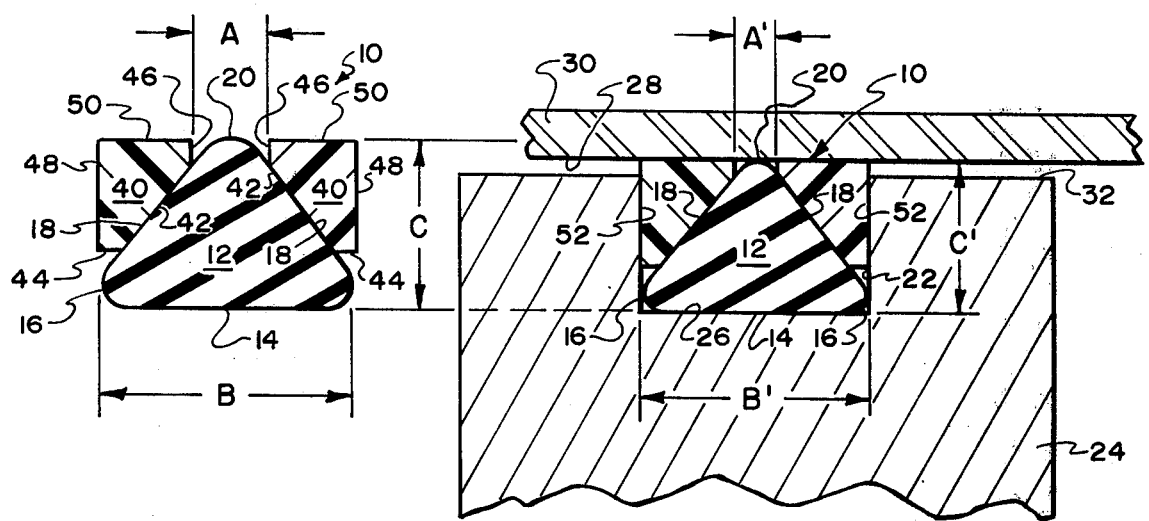
FIG. 2
FIG. 3

INTERFERENCE COMPRESSION SEAL

BACKGROUND

1. Field of Invention

This invention relates to an interference compression seal and particularly to a novel multi-component seal comprising a deformable delta-shaped seal flanked by two anti-extrusion rings contiguously compressively engaging the diagonal sides of the delta-shaped seal.

2. Prior Art

In the past, it has been common to provide what is referred to in the art as Tee seals placed in a standard groove between first and second relatively movable machine parts to prevent fluid displacement across such sites. The use of the Tee seals is normally associated with high pressure machinery, which often causes misorientation, twisting and/or extrusion of yieldable seal materials so that in effect the fluid tight relationship is lost, the seal becomes ineffective and its useful life greatly reduced if not eliminated because of said distortions. Furthermore, such Tee seal arrangements become, within a relatively short period of time, somewhat ineffective because they loosen with wear whereby fluid is able to be displaced across such seals following such wear.

BRIEF SUMMARY AND OBJECTS OF THE PRESENT INVENTION

The present invention provides a unique interference compression seal comprising a yieldable delta-shaped relatively soft seal having diagonal or bevelled surfaces which converge radially to an apex, each bevelled surface being engaged by an anti-extrusion ring of relatively hard synthetic resinous material, the composite seal being adapted to be disposed within a gland groove of one machine part (e.g. either a piston or, alternatively, the wall of a cylinder in which a piston or ram reciprocates) such that dimensions of the delta-shaped seal are constricted in the groove by the anti-extrusion rings which are, by action of equal and opposite pressures from the delta-shaped seal, caused to forcibly engage a surface of another relatively movable machine part (where wear results), the interface and pressure between the bevelled surfaces of the delta-shaped seal and the corresponding surfaces of the two anti-extrusion rings accommodating automatic take up for wear caused to the anti-extrusion rings while maintaining of a firm seal between the base of the delta-shaped seal and the base of the groove of the first machine part and a line seal at the apex of the delta-shaped seal.

A primary object of the present invention is the provision of an improved interference compression seal.

A further significant object of the present invention is the provision of the compression seal comprising a relatively soft and deformable delta-shaped seal and two anti-extrusion rings which accommodate improved sealing, reduced deformation of the soft elastomeric delta-shaped seal due to misorientation, twisting, extrusion and the like, and which provides an automatic take up for wear incurred upon the anti-extrusion rings by relative movement of machine parts.

These and other objects and features of the present invention will be apparent from the following detailed description, taken with reference to the accompanying drawings.

BRIEF DESCRIPTION OF THE DRAWINGS

FIG. 1 is a partial broken away perspective of an interference compression seal made in accordance with the present invention;

FIG. 2 is a cross-sectional view of the seal of FIG. 1 in an at rest or unstressed condition; and FIG. 3 is a cross-sectional view of the seal of FIG. 1 constrictively installed within a groove of one machine part and contiguously engaging a surface of a second machine part.

DETAILED DESCRIPTION OF THE ILLUSTRATED EMBODIMENTS

Reference is now made to the drawings wherein like numerals are used to designate like parts throughout and where is generally illustrated an interference compression seal, generally designated 10. While the seal 10 is illustrated (FIG. 3) as being disposed in a groove of a piston or ram, it is to be appreciated that the components could be fabricated so as to leave reverse orientations (opposite arcuately curved) for use in a groove of the interior wall of a cylinder in which a piston or ram reciprocates.

The illustrated multi-component seal 10 comprises a relatively soft delta-shaped seal 12 of synthetic resinous or elastomeric material, such as rubber, which may be readily deformed and compressed. The delta-shaped seal 12 is generally annular in its longitudinal configuration and comprises an inside flat base surface 14, base rounded corners 16, diagonal or bevelled sides 18 and a rounded apex 20. The delta-shaped seal 12 is adapted to be placed in a gland groove 22 of a first machine part 24, which may be a piston, for example, wherein the base 14 is firmly contiguous with the groove base 24 and the apex 20 of the delta-shaped seal engages, seals and wipes a surface 28 of a second machine part 30 (which is relatively displaced in regard to machine part 24) and may be, for example, a cylinder in which a piston comprising part 24 reciprocates. It should be clear that the radial surface 32 of the first machine part 24 is spaced a short distance from surface 28 of second machine part 30 and only the seal 10 makes contact with both machine parts. The delta-shaped seal 12 is deformed in its installed position between said machine parts in groove 22 (illustrative in FIG. 3) in a manner and for purposes hereinafter more fully explained.

The multi-component seal 10 also comprises two extrusion rings 40 which are identical though of opposite hand. For simplicity, only one will be described. Each anti-extrusion ring 40 is formed of a hard wear-resistant non-deformable material preferably of synthetic resinous material such as rigid nylon, phenolic laminates, hard teflon, hard urethane, and the selected material may, if desired, be reinforced by any suitable material such as fiberglas. The anti-extrusion rings 40 are adapted to wear by reason of the relative movement between machine parts 24 and 30 and to this end each comprise a bevelled or diagonal surface 42, the surface 42 merging with a tangential surface 44 of relatively short length at one end thereof and a radial surface 46 also of relatively short distance at the other end, each anti-extrusion ring being generally annular in its longitudinal configuration. Each anti-extrusion ring also presents a radially directed flat surface 48 and an outward circumferential surface 50 which is the wear-receiving surface.

The three components of the overall seal 10 are assembled as illustrated in each of the Figures wherein the bevelled surfaces 42 of the anti-extrusion rings 40 respectively engage one of the bevelled or diagonal surfaces 18 of the deformable delta-shaped seal 12 such that there is in an at rest or unstressed condition a gap between the two anti-extrusion ring surfaces 46 of a distance A, the multi-component seal 10 also defining an overall base dimension of B and a radial height of C. See FIG. 2.

The seal in the assembled and installed condition of FIG. 3 is caused to be radially constricted and axially enlarged within the groove 22 of machine part 24. The groove base 26 has a dimension of B' which is greater than the dimension B, it being intended that the base 14 of the delta-shaped seal 12 engages all or nearly all of the groove base 26. The height or radial dimension C' from the base 26 to the arcuate surface 28 of second machine part 30 is less than the at rest height C of the seal in its unstressed condition and the distance A' between the extrusion ring surfaces 46 in the installed position FIG. 3 is a dimension either equal to or preferably slightly greater than the corresponding unstressed dimension A. Thus, the diagonal surfaces 44 of the anti-extrusion rings 40 exert substantial pressure upon and normal to the bevelled surfaces 18 of the delta-shaped seal 12 and the delta-shaped seal exerts an equal and opposite pressure upon the diagonal surface of each anti-extrusion ring 40. As a consequence, the seal 12 is compressed, constricted and deformed with its dimensions being altered as indicated when comparing dimensions A with A', B with B' and C with C'. The delta-shaped seal exerts a high pressure force at its base 14 upon the groove base 26 and at the line engagement between the apex 20 and the cylinder wall 28 to prevent fluid displacement thereacross, the apex 20 of the delta-shaped seal 12 wiping the surface 28 during relative movement between machine parts 24 and 30. The seal 12 in turn exerts a high pressure force against the two anti-extrusion rings such that they are caused respectively to somewhat engage the side walls 52 of the groove 22 and to firmly contact the arcuate machine surface 28. The latter engagement between the circumferential surfaces 50 of the two anti-extrusion rings 40 and the surface 28 result in wear to the anti-extrusion rings 40 over a period of time. However, the radial pressure component exerted by the delta-shaped seal 12 against the anti-extrusion rings 40 results in an automatic "take up" due to the wear so that the seal continues to perform effectively over a long period of time notwithstanding considerable wear imposed upon one or both of the seals 40, it being significant that the amount of wear on each anti-extrusion ring 40 need not be the same, the delta-shaped relatively soft seal 12 causing each anti-extrusion ring to be displaced only that distance required to compensate for wear.

It is to be appreciated that the manner in which the generally triangular shaped anti-extrusion rings act against the delta-shaped deformable seal 12 and vice versa results in a maintenance of accurate orientation of the combined seal, locks the delta-shaped seal in place, makes twisting of the delta seal impossible and absolutely prohibits extrusion of the delta seal in addition to providing the automatic wear take up capability mentioned earlier.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An interference compression seal assembly comprising:

first and second relatively displaceable machine parts;

a delta-shaped annular seal of deformable material having memory, said delta-shaped seal comprising three surfaces only, a base surface to engage substantially all of the base of a U-shaped groove in the first machine part and two convergent diagonal side surfaces merging at an apex, said seal further comprising three corners, one corner being disposed at the intersection of each two surfaces, two of the seal corners to be respectively disposed in the base corners and the third seal corner comprising the apex to deformingly engage the second machine part.

two generally triangularly shaped annular anti-extrusion rings having three major surfaces only and comprising hard rigid synthetic resinous material one of each of said ring surfaces being diagonally oriented between the other ring surfaces, the diagonal surface of the two rings respectively contiguously engaging substantially the entire length of the two diagonal surfaces of the delta-shaped seal, one of the other surfaces of each ring respectively engaging the opposed side walls of the groove and, the second of the other surfaces of each ring along their full length respectively engaging a common surface of a second machine part, the anti-extrusion rings being spaced from the base of the grooves and transmitting force to said groove base solely through diagonal side surfaces of the seal, the anti-extrusion rings constricting and compressing the delta-shaped seal inwardly and toward the second machine part when so placed in said groove, each of the two anti-extrusion rings being separate one from the other at said apex seal corner and each presenting at said second other ring surface an annular circumferential wear surface, to engage said common surface of the second machine part which experiences relative motion in respect to said first machine part, the one other surface of each anti-extrusion ring comprising a radial surface, to contact the adjacent side wall of the groove.

2. An interference compression seal assembly according to claim 1 wherein the apex seal corner of the delta-shaped seal is adapted to engage, seal against and wipe said second machine part surface and each anti-extrustion ring has a minor relatively short radial surface adjacent the apex corner connecting the diagonal and the circumferential wear surfaces.

* * * * *